May 8, 1923.
H. F. RICHTER
PRESSURE CONTROLLING DEVICE
Filed March 1, 1921
1,454,409
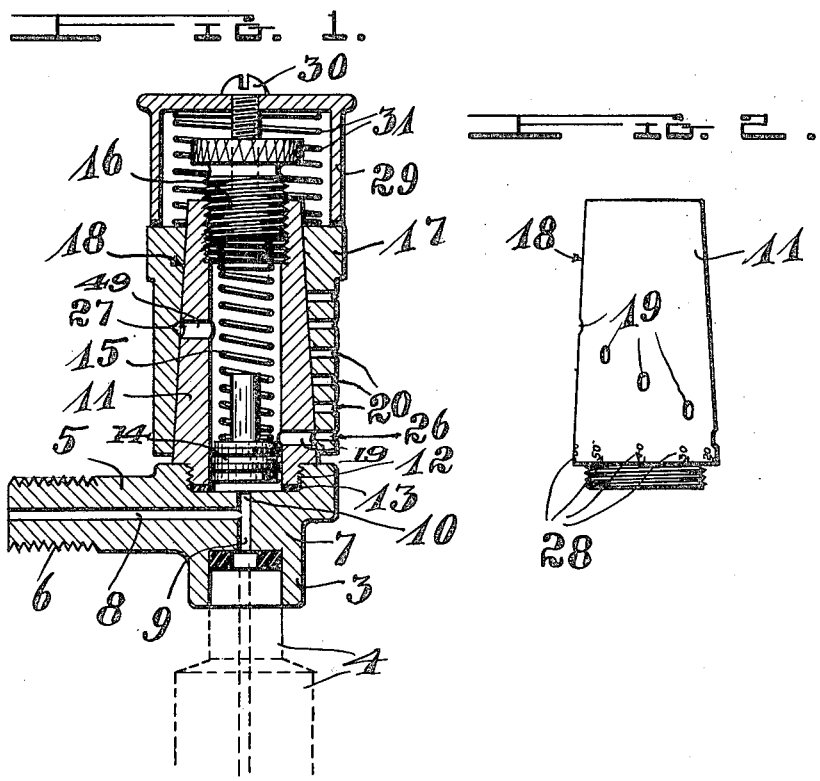

Patented May 8, 1923.

1,454,409

UNITED STATES PATENT OFFICE.

HERMAN F. RICHTER, OF LOS ANGELES, CALIFORNIA.

PRESSURE-CONTROLLING DEVICE.

Application filed March 1, 1921. Serial No. 448,888.

*To all whom it may concern:*

Be it known that I, HERMAN F. RICHTER, a citizen of the United States, residing at Los Angeles, in the county of Los Angeles and State of California, have invented a new and useful Pressure-Controlling Device, of which the following is a specification.

This invention relates to devices for controlling the transferring of pressure from one container to another.

One of the objects of this invention is to provide a device by which a medium may be transferred from one container to another up to a predetermined pressure.

Another object is to eliminate gauges on the receiving container by allowing only a predetermined pressure to enter or reach the receiving container.

Another object is to provide an adjustable nozzle by which a medium will pass the nozzle only to a predetermined pressure to which the nozzle was adjusted.

Another object is to provide an adjustable nozzle by which a medium will pass the nozzle only to a predetermined pressure to which the nozzle was adjusted, and which will indicate that the pressure has been reached.

Another object is to provide a device which can be set and adjusted, and can be used for injecting air into the tube of automobile tires, allowing only air to get into the tire up to the pressure to which the device was adjusted, and which will indicate that and when the pressure has been reached.

Other objects will appear from the following description and appended claims as well as from the accompanying drawing, in which—

Fig. 1 is a general midsectional view of the device, the outer termination of a tire valve being indicated in dotted lines.

Fig. 2 is a side elevation of the body or cylinder of the device.

It is customary to inject air into the tube of automobile tires, and then apply a gauge to ascertain the pressure contained in the tube or tire. In the first place, much depends on the station or source from which the air is taken. If such a source contains a high pressure, the tire is inflated rather rapidly, and may become over-inflated before it is expected, a condition which may easily cause damage to the tire. On the other hand, in applying a gauge to the inflated tire, an amount of air is naturally allowed to pass out of the inflated tire while ascertaining and trying to find out the pressure contained in the tire. Furthermore, it requires time to inject air and to apply a gauge. Careful users and operators normally inject air gradually and apply a gauge several times before the desired pressure is reached, to avoid an overcharging of the tire.

All this takes unnecessary time, and requires experience by the operator, if not an expert, to assure satisfaction as to use and life of the tire and as to service of proper softness combined with correct inflation of the tire so as to give the desired comfort.

The main object is therefore, to provide a device which works automatically in allowing a desired amount of air to enter the tire, assuring a proper inflation; and disclosing when such or a desired pressure in the tire has been reached.

In the drawing, in Fig. 1, the mouth end 3 is made of a size and form to easily and properly engage over the outer termination of a tire valve, the outline of the outer end of such a tire valve being indicated in dotted lines at 4. The engaging end 5 of the device is provided with similar threads, indicated at 6, as are commonly in use on the outer ends of tire valves, to allow an applying of an air supplying hose or connection to this end 5.

The ends 3 and 5 are naturally on a common socket 7. The inlet bore 8 communicates with a cross bore, this cross bore terminating in the direction towards the mouth 3, as indicated at 9, to pass air into a connected tire valve, the other termination 10 of the cross bore serving to pass air into the cylinder of the device. The cylinder of the device is indicated at 11, and in the drawing illustrated as connected to the socket at 12 with a packing ring 13 in the joint, but it will easily be understood that the cylinder and socket may be made of one piece, or so as to form one member. A plunger or movable member 14 is disposed in the cylinder controlled by the spring 15. The plug 16 is adjustably engaged in the farther end of the cylinder, for adjustably holding the spring 15 under a suitable tension to control the movements of the movable member 14. A sleeve 17 is disposed over the outside of the cylinder mainly for a rotating adjustment. The outside of the cylinder is preferably made conical, as indicated at 18, and the bore of the sleeve 17 is provided with a corresponding inner face. The engagement between the conical body or cylinder and the sleeve 17 is intended to form an airtight seal between these two members. Both members are provided with a number of perforations, of which not more than one of one member comes into alignment with perforations in the other member. In Fig. 2, the perforations in the body or cylinder 11 are illustrated arranged in a helical manner in relation to the longitudinal axis of the cylinder, as indicated at 19. In Fig. 1, the perforations in the sleeve 17 are illustrated as arranged along a a straight line, practically along the longitudinal axis of the sleeve 17, as indicated at 20. The lowermost hole or perforation 20 in the sleeve 17, in Fig. 1, is shown in alignment with the lowermost hole 19 in the cylinder 11 as indicated at 26. All other perforations in the cylinder 11 are covered by the sleeve 17, the numeral 27, for instance, indicates the sealing of one of the perforations.

Having illustrated the perforations in the cylinder along a helical line and the perforations in the sleeve along a straight line, it will easily be understood that this arrangement may be reversed with similar results, and that the perforations may even still further differ in their relation as long as not more than one of the perforations in one body comes into alignment with any more than one of the perforations in the other body. Such slight modifications naturally would not amount to a departure from the principle of this invention, and may easily be arranged to suit preexisting conditions by anyone who would be willing to use a device of this type.

Having the spring 15 placed under a suitable tension, it is natural that a certain pressure in the bore 8, being allowed to pass into the cylinder, produces a corresponding presure on the movable member 14 and thereby a corresponding movement of the movable member into the cylinder, so that the movable member comes eventually to a position above the lowermost perforation 19. Different pressures in the bore 8 and therewith against the movable member 14 naturally correspond to certain movements and positions of the movable member within the cylinder, so that the perforations in the cylinder may be arranged to just be freed when the corresponding pressure is maintained or produced in the device.

Providing certain indicating marks 28 on the outside of the cylinder at a point not covered by the sleeve 17, according and corresponding to the pressure and according and corresponding to the movement and position to which the movable member is subjected at and under certain pressures, the sleeve has only to be turned to a position to bring the perforations in the sleeve in alignment with the indicating mark showing the desired pressure, and the air naturally passes through the perforations brought into alignment in this manner, indicating when the desired pressure has been reached in the device and preventing an over-charging beyond the desired pressure, since the air naturally passes out through the aligned perforations.

A cap 29 is provided, adjustably held to the device by the screw 30, inclosing the spring 31 for evenly and tightly engaging the sleeve 17 with the cylinder 11.

Having thus described my invention, I claim:

1. In a safety valve, a body, a cylinder on the body having discharge apertures at different points, a movable member in the cylinder disposed so as to reach the different apertures in the cylinder under different pressures, and a sleeve movable over the outside of the cylinder having an aperture to be disposed in alignment with any one of the apertures in the cylinder permitting discharge only at this point when the movable member in the cylinder reaches this point.

2. In a safety valve, a body, a cylinder on the body having discharge apertures at different points, a movable member in the cylinder disposed so as to reach the different apertures in the cylinder under different pressures, and a sleeve movable in relation to the cylinder independently of the first-named movable member having an aperture adapted to come into alignment with any one of the apertures in the cylinder to form the discharge of the device when the first-named movable member reaches a point past such apertures to allow communication through the apertures so aligned and through the body.

3. In a safety valve, a body having a passage therethrough, a cylinder on the body having apertures at different points in relation to its longitudinal axis adapted to form communication through the cylinder and through the passage in the body, a movable member in the cylinder normally disposed so as to prevent communication between the apertures in the cylinder and the passage in the body and adapted to free the different apertures under different pressures, means for holding the movable member under a normal tension, adjusting means for holding the tension means in suitable relation to the pressure so that the movable member will align with certain of the discharge apertures at certain degrees of the pressure, means for controlling the discharge to a desired pressure, and means for adjustably holding the controlling means under even tension slidingly engaged over the cylinder.

4. In a safety valve, a cylinder having a longitudinal bore and having other bores at different points along the longitudinal axis crosswise to the longitudinal bore, the outside of the cylinder being of conical shape to receive a controlling cover over the different cross-bores.

5. In a safety valve, a body having a passage therethrough, a cylinder having communication with the passage in the body, the cylinder having a cylindrical inside and a conical outside, the cylinder having also passages from the inside to the outside at different points along the longitudinal axis, a movable member slidingly disposed in the cylinder to reach the different passages from the inside of the cylinder to the outside under different pressures, the movable member being operative by the pressure in the passage of the body, means for controlling the movable member so as to reach the different passages from the inside of the cylinder to the outside at certain pressures, a cover to normally close the different passages from the inside of the cylinder to the outside having discharge passages at points to align one at a time with one of the passages in the cylinder, and means to adjustably and turnably seal the cover to the outside of the cylinder.

In testimony that I claim the foregoing as my invention I have signed my name in the presence of two subscribing witnesses.

HERMAN F. RICHTER.

Witnesses:
  OTTO H. KRUEGER,
  JESSIE A. MANOCK.